(No Model.)

W. A. POLMATEER.
SHUTTLE MECHANISM FOR SEWING MACHINES.

No. 308,853. Patented Dec. 2, 1884.

Attest.
Sidney P. Hollingsworth
Newton Wyckoff

Inventor.
W. A. Polmateer
By his attorney
Philip T. Dodge

UNITED STATES PATENT OFFICE.

WILLIAM A. POLMATEER, OF JOHNSTOWN, NEW YORK, ASSIGNOR TO WILLIAM S. NORTHRUP, OF SAME PLACE.

SHUTTLE MECHANISM FOR SEWING-MACHINES.

SPECIFICATION forming part of Letters Patent No. 308,853, dated December 2, 1884.

Application filed December 10, 1883. (No model.)

*To all whom it may concern:*

Be it known that I, WILLIAM A. POLMATEER, of Johnstown, in the county of Fulton and State of New York, have invented certain Improvements in Shuttle Mechanism for Sewing-Machines, of which the following is a specification.

This invention relates to that class of machines in which the shuttle receives a reciprocating motion.

The object of the invention is principally to avoid the wear and friction which result in the ordinary machine from the shuttle moving in contact with a fixed race or guide.

To this end the invention consists, essentially, in combining with the shuttle-carrier a movable arm or clamping device, by which the shuttle is held securely in place thereon, out of contact with the stationary parts of the machine; and also in combining with the clamping device, as above described, means whereby it is lifted from the shuttle at the instant of passing the needle, which enters between the shuttle and clamp.

The device may be modified in form to a considerable extent without departing from the limits of my invention.

In the accompanying drawings I have shown the improvement applied to a machine in which the shuttle-carrier is arranged to vibrate in a horizontal plane below the bed-plate.

Figure 1:
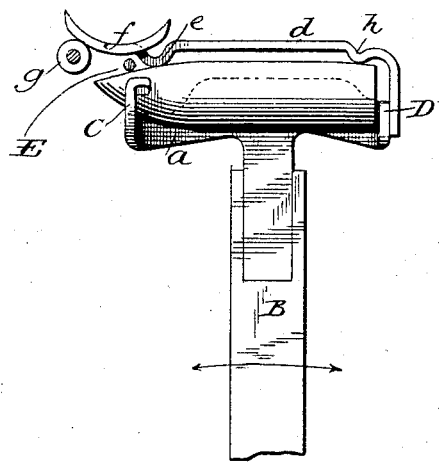
Figure 2:
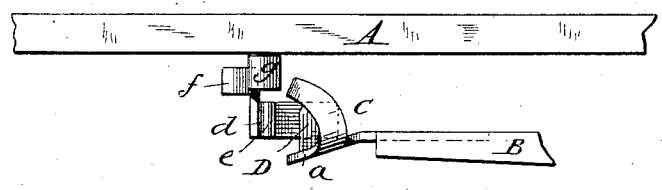

Figure 1 represents a top plan view of a shuttle-carrier and the device for securing the shuttle to the carrier. Fig. 2 represents an edge view of the same, the shuttle being omitted in order to expose the other parts to view.

A represents the bed-plate of the machine, and B the horizontal vibrating arm or shuttle-carrier, which is provided at its extremity with the usual shuttle-supporting plate or head, consisting of a horizontal portion, a, to rest beneath the shuttle-body, and two upright arms or extremities, C and D, to engage with the respective ends of the shuttle B. These parts are of ordinary construction, and are not claimed as of my invention.

To the rear end of the shuttle-carrier I secure one end of a spring-arm, d, which is curved to extend forward along the outer side of the shuttle, and provided with depressions or bent portions e and h, to bear upon the outer side of the shuttle and hold the same in position on the carrier proper. The shuttle being thus held in place on the carrier by means of the arm d will be carried to and fro therewith without the necessity of employing the usual stationary guide or race. It is to be particularly noted that when thus supported in place the shuttle is free to move without being brought in contact with any stationary device whatever, and that consequently the usual wear and friction incident to the action of a shuttle against a stationary guide are avoided. The needle will descend, as usual, in close proximity to the outer edge or side of the shuttle, and in order that the shuttle may be carried forward past the needle it is necessary that the arm d shall be momentarily drawn out of contact with the shuttle. This is accomplished by providing the arm d with a curved plate, f, and attaching to the under side of the bed-plate a stationary stud or roller, g, located in such position that the plate f will act thereon and be forced back thereby, so as to throw the arm d away from the shuttle, this action occurring at the instant that the bent portion e of the arm d is passing the needle. As it is only necessary that the point of the shuttle shall be guided to pass in close proximity to the needle, there may be sufficient play between the rear end of the shuttle and the carrier to permit the needle-thread to pass over the heel of the shuttle. In the operation of the machine the needle will be elevated before the point h reaches the same, so that there will be no danger of said point striking the needle.

It will be noted as a peculiarity of my organization that the carrier-arms C and D engage the shuttle at its opposite extremities and on one side, while the spring-arm d acts thereon from the opposite side, thus locking the shuttle to the carrier-arms in such manner that no race or other rigid support is necessary. It will therefore be seen that the friction which ordinarily occurs between the shut tle and the surface of the stationary race or guide is wholly overcome. The needle with which the shuttle co-operates as usual descends at the point E, Fig. 1. The stud $g$ acts to lift the arm $d$ away from the shuttle at the instant that the projection $e$ passes the needle, in consequence of which the arm is carried over the needle and the needle-thread without producing friction thereon. By constructing the arm $d$ to bear upon the two ends of the shuttle only it will be seen that during the greater portion of the time that the shuttle is passing the needle the latter will occupy the space or opening between the side of the shuttle and the inner side of the arm $d$ without being brought into frictional contact with either.

I am aware that springs have been employed to force a shuttle against the needle during its passage thereby, in order that it may be certain to engage the needle-thread; also that shuttles have been driven by pins or studs, which were momentarily withdrawn therefrom in order to permit the passage of the needle-thread thereby, and to such construction, I lay no claim.

The essential feature of the invention consists in the employment of the pressure-arm to act upon the shuttle, in combination with a device to momentarily relieve the shuttle from the action of the arm, in order that they may pass on opposite sides of the needle, and it will be manifest to the skilled mechanic that the form and arrangement of the details may be modified to a considerable extent without essentially changing the mode of action described.

It will also be obvious that the clamping device may be applied not only to shuttle-carriers which move in the arc of a circle, but also to those which reciprocate in right lines.

I do not claim herein any device or combination of devices illustrated in the Letters Patent filed by me on the 17th day of November, 1883, No. 112,080.

Having thus described my invention, what I claim is—

1. In combination with the needle and shuttle, the shuttle-carrier having the arms C D to carry opposite ends of the shuttle, the spring-arm $d$, attached to the carrier and acting on the outer side of the shuttle, as described, to hold the same upon the arms C D, and the fixed stud or roller $g$, acting to lift the arm $d$ momentarily from the shuttle while passing the needle.

2. In a sewing-machine, a reciprocating needle, in combination with a shuttle-carrier provided with arms to sustain and drive the shuttle, a spring-arm applied to said carrier and acting, substantially as described and shown, to retain the shuttle thereon without the assistance of a race or fixed guide, and a stud or cam to lift said arm momentarily from the shuttle during its passage by the needle.

3. In a sewing-machine, a reciprocating carrier provided with arms to support and drive the shuttle from one side, a needle arranged to descend on that side of the shuttle distant from the carrier, a spring-arm attached to the carrier and arranged to act against the side of the shuttle, and a stationary cam or roller, substantially as described, acting to lift the end of the spring-arm away from the shuttle and clear of the needle during its passage thereby.

WM. A. POLMATEER.

Witnesses:
ANDREW J. NELLIS,
J. LEONARD NORTHRUP.